United States Patent
Dutta

(10) Patent No.: US 6,789,076 B1
(45) Date of Patent: Sep. 7, 2004

(54) SYSTEM, METHOD AND PROGRAM FOR AUGMENTING INFORMATION RETRIEVAL IN A CLIENT/SERVER NETWORK USING CLIENT-SIDE SEARCHING

(75) Inventor: Rabindranath Dutta, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/569,503

(22) Filed: May 11, 2000

(51) Int. Cl.[7] .............................................. G06F 17/30

(52) U.S. Cl. ............................................ 707/5; 707/10

(58) Field of Search .............................. 707/5, 10, 2, 3, 707/4, 200; 709/203, 200

(56) References Cited

U.S. PATENT DOCUMENTS

| | | | |
|---|---|---|---|
| 5,471,677 A | | 11/1995 | Imanaka |
| 5,537,586 A | | 7/1996 | Amram et al. |
| 5,659,732 A | | 8/1997 | Kirsch |
| 5,694,592 A | | 12/1997 | Driscoll |
| 5,706,497 A | | 1/1998 | Takahashi et al. |
| 5,826,270 A | * | 10/1998 | Rutkowski et al. ........... 707/10 |
| 5,859,972 A | | 1/1999 | Subramaniam et al. |
| 5,864,846 A | | 1/1999 | Voorhees et al. |
| 5,931,907 A | | 8/1999 | Davies et al. |
| 5,933,822 A | | 8/1999 | Braden-Harder et al. |
| 5,940,289 A | * | 8/1999 | Iwata et al. ..................... 700/2 |
| 5,974,409 A | | 10/1999 | Sanu et al. |
| 6,078,917 A | * | 6/2000 | Paulsen, Jr. et al. ............ 707/6 |
| 6,151,600 A | * | 11/2000 | Dedrick ........................ 707/10 |
| 6,269,361 B1 | * | 7/2001 | Davis et al. .................... 707/3 |
| 6,278,993 B1 | * | 8/2001 | Kumar et al. ................... 707/3 |
| 6,314,419 B1 | * | 11/2001 | Faisal ............................. 707/2 |
| 6,334,124 B1 | * | 12/2001 | Bouchard et al. .............. 707/3 |
| 6,397,210 B1 | * | 5/2002 | Stern et al. ..................... 707/3 |
| 6,480,835 B1 | * | 11/2002 | Light ............................. 707/3 |

OTHER PUBLICATIONS

IBM Technical Disclosure Bulletin, "Searching with Contextual Search Commands and Interchange Document Profile Information," Mar. 1988.
IBM Technical Disclosure Bulletin, "Searching for Documents that do not have a Standalone View," Oct. 1989.
IBM Technical Disclosure Bulletin, "Contextual Data for Groups of Documents," Oct. 1989.
IBM Technical Disclosure Bulletin, "Information Retrieval System Interface," Nov. 1989.
IBM Technical Disclosure Bulletin, "Subsetting of Directory Partitions and Conditional Use for Query," May 1991.

(List continued on next page.)

*Primary Examiner*—Greta Robinson
(74) *Attorney, Agent, or Firm*—Kevin L. Daffer; Conley Rose P.C.; Marilyn S. Dawkins

(57) ABSTRACT

In a system, method and program for identifying information accessible over a client/server network, search results obtained by a search engine running on a server may be improved by utilizing computing resources on a client. Initial search results produced by the server search engine are further processed on the client machine, which may produce a more refined set of search results. The processing on the client machine may be done using a client-side search program. The usefulness of the search results to a user may therefore be improved without the need for additional server resources. Data associated with the additional search results produced by the processing on the client may be sent back to the server. The server may then update its search engine such that results for subsequent searches on the server may be improved. A system for implementing the improved searching may include a network server having a server-side search program and a network client having a browser and a client-side search program. Program instructions implementing methods of the improved searching using such a system may be included on a carrier medium, which may be a transmission medium or storage medium.

28 Claims, 4 Drawing Sheets

OTHER PUBLICATIONS

IBM Technical Disclosure Bulletin, "Intelligent Document Retrieval," Jun. 1991.

IBM Technical Disclosure Bulletin, "Taxonomized Web Search," May 1997.

* cited by examiner (a)

| results for "solar energy" | | |
|---|---|---|
| Rank | Rating | Title |
| 1. | 8 | Solar Energy Unlimited; Hometown, USA |
| 2. | 6 | Nuclear Energy Promotion Society |
| 3. | 4 | Solar Energy Research Institute; Big State University |
| 4. | 2 | International Renewable Energy Society |

(b)

| user-revised results for "solar energy" | | |
|---|---|---|
| Rank | Rating | Title |
| 1. | 10 | Solar Energy Research Institute; Big State University |
| 2. | 8 | International Renewable Energy Society |
| 3. | 2 | Solar Energy Unlimited; Hometown, USA |
| 4. | 0 | Nuclear Energy Promotion Society |

(c)

| results for "solar energy" | | |
|---|---|---|
| Rank | Rating | Title |
| 1. | 6 | Solar Energy Unlimited; Hometown, USA |
| 2. | 6 | Solar Energy Research Institute; Big State University |
| 3. | 4 | Nuclear Energy Promotion Society |
| 4. | 4 | International Renewable Energy Society |

Fig. 4

SYSTEM, METHOD AND PROGRAM FOR AUGMENTING INFORMATION RETRIEVAL IN A CLIENT/SERVER NETWORK USING CLIENT-SIDE SEARCHING

BACKGROUND OF THE INVENTION

1. Field of the Invention

This invention relates to networks of computational devices, and more particularly to enhancement of identification of relevant information accessible using such a network.

2. Description of the Related Art

The following descriptions and examples are not admitted to be prior art by virtue of their inclusion within this section.

The continuing proliferation of powerful, convenient computational devices has been accompanied by an increase in the use of networks connecting these devices. Computational devices include computers and other, often portable, devices such as wireless telephones, personal digital assistants, and automobile-based computers. Such portable computational devices are also sometimes termed "pervasive devices". "Computer", as used herein, may refer to any of such computational devices. The networks connecting computational devices may be "wired" networks, formed using "land lines" such as copper wire or fiber optic cable, wireless networks employing earth and/or satellite-based wireless transmission links, or combinations of wired and wireless network portions. Many networks are organized using a client/server architecture, in which "server" computational devices manage resources, such as files, peripheral devices or processing power, which may be requested by "client" computational devices. The client device is often operated by a user of the network. Computational devices not operated directly by a user, such as "proxy servers" which act on behalf of other machines, may act as either clients or servers.

Currently a very widely used network is the Internet, a global network of computational devices which communicate using a set of protocols called TCP/IP (transmission control protocol/Internet protocol). An especially popular aspect of the Internet is the World Wide Web (WWW, or "web"), a collection of interlinked documents formatted in hypertext markup language (HTML). These documents, or "web pages", may incorporate text, graphics, audio, and/or video content, and may include convenient links to one another, often called "hyperlinks" or simply "links". Documents or files are requested by client computers through an application program called a web browser. The files are requested from server computers, or "web servers". The transmission of the files over the web uses an additional Internet protocol called hypertext transfer protocol (HTTP).

An important feature of the Internet is that it is substantially free of central organization. A server hosting, for example, web pages can be connected to the Internet easily and at relatively low cost. Although this decentralization allows extremely wide access, and an ever-increasing variety and availability of information, identifying and locating specific pieces of information (or, e.g., information on a specific topic) can be extremely difficult. For this reason, various database systems, including search engines and directories, have been developed to aid users in finding specific types of information. These database systems typically contain an entry for each web page (or other file or document) included in the database, so that the database can be searched relatively quickly without the need to retrieve actual web pages in order to perform a search. An entry may include, for example, a network address of the page (typically a Uniform Resource Locator, or URL) along with one or more keywords associated with the page content and possibly a brief summary of the page content. Although "search engine" is often used to describe any such database system, a "search engine" is sometimes distinguished from "directory" in that with a search engine the database entries are collected automatically using programs (often called "spiders", "robots" or "crawlers") which visit web pages and collect the needed data (typically by downloading a page file and subsequently processing the file). Examples of currently available search engines include AltaVista and Excite. "Directory" may be used to describe a database for which entry information is submitted manually, typically by a web site developer. Yahoo! is an example of a currently available Internet directory (Yahoo! also currently provides an automated search engine called Inktomi). "Search engine" as used herein may refer to either of these types of database system.

An illustration of a client-server network containing a search engine server is shown in FIG. 1. Network 11 connects various computational devices, such as search engine server 15, clients 17, and information content servers 42. Although these computational devices are shown outside of the oval representing network 11 for clarity, these devices are actually a part of the network as well. In the embodiment of FIG. 1, network 11 is the World Wide Web, and may include millions of web content servers 42, represented collectively by the surrounding dashed line, located anywhere in the world. Each content server may store, or "host", one or more web sites 13. Each web site includes one or more web pages, as described above. Transmission media 26 are used to connect the search engine server, clients, and content servers hosting the web sites to network 11, which includes other transmission media and computational devices interconnected all over the world. In a typical searching sequence, communication is established over network 11 between a client 17 and search engine server 15, typically using a web browser program on the client. Search criteria are entered by a user of the client machine, and transmitted to the search engine server. The search engine server searches the information available on the network, including the information content servers 42, for documents relevant to the search criteria. This is typically done by searching a database stored on the search engine server, where the database includes previously-formed entries corresponding to web pages accessible over network 11. The results of the search are transmitted back to the requesting client. The client may then, for example, access particular web pages included in the results directly over network 11, as desired by the user.

The large and constantly expanding size of the Internet and World Wide Web presents difficult challenges for using search engines in the above-described process. For example, most engines are currently unable to index (create database entries for) the entirety of the documents available on the Internet, or even a substantial fraction of these documents. The storage space and computational time constraints which limit the ability of the engines to index documents may also limit the complexity of the database entries for documents which are indexed, such that only a rough categorization and/or analysis of search results may be performed. This may create various problems for a user of search engines, including excessive numbers of "hits", or documents matching the search query, returned by the engine. The documents returned in response to a search query may also be incorrectly matched to the subject of the query, and incorrectly or insufficiently categorized (if categorized at all in a way apparent to the user). In some cases, for example, priority of search results returned may be influenced by factors such as advertising revenue to a search engine's web site. Resource limitations on the search engine server often prevent the use of algorithms which might improve the accuracy and categorization of search results. However, the algorithms for categorization and searching are often very good, particularly the ones utilizing techniques from the field of artificial intelligence. The fundamental problem is believed to be the resource restrictions on the search engines. Hence the search engines often use "quick and dirty" algorithms for categorization and searching. Typically this involves examining only a few keywords or hyperlinks in a Web page and rapidly returning the results. Incremental classification is often done in a semi-automated or manual fashion.

It would therefore be desirable to develop a system and method to improve the accuracy of network search results without increasing resource requirements for a search engine server. The desired method would allow improvement of the results of both a current search and future searches involving a topic.

SUMMARY OF THE INVENTION

The problems outlined above are in large part addressed by a system, method and program for improving initial search results obtained by a client from a server by utilizing computing resources on the client. The initial search results are further processed on the client machine, which may produce a more refined set of search results. For example, the search results may be re-prioritized and/or categorized, or less relevant results may be discarded. The usefulness of the search results to a user may therefore be improved, without the need for additional server resources (e.g., computation time or storage space). The additional search results produced by the processing on the client, or at least information derived from the additional results, are preferably sent back to the server. The server may then update a database according to the additional search results, so that results for subsequent searches on the server may be improved. This updating could involve, for example, adding an additional keyword to some database entries, or removing an inappropriate keyword from an entry. The additional processing of the search results on the client may in some embodiments be done at times of low utilization of the client machine, or as a background process, rather than being done real-time during a user's search session.

In an embodiment of a method for identifying stored information accessible over a network, initial results corresponding to an initial search of the stored information are transferred from a network server to a network client. An additional search of the initial results is performed using the client to produce additional results (e.g., a refined version of the initial results), and data associated with the additional results is transferred from the client to the server. The initial search results transferred to the client may include descriptions of files accessible over the network, and such a description may include, for example, a network address and one or more keywords associated with the corresponding file. Performance of the additional search may include comparing the initial results to user-entered search criteria. In some embodiments, the stored information corresponding to the initial results (e.g., network-accessible files or documents) may be downloaded by the client, and the stored information compared to the user-entered search criteria. The additional search may in some embodiments include ranking and/or categorizing of the initial results by a user. This ranking or categorizing by the user may be done "manually", for example by manipulation within a graphical user interface of icons representing documents (or descriptions of documents) returned by the initial search. The transfer of data associated with the additional results may, in an embodiment, include transferring the additional results or a subset of the additional results. Alternatively, the transferred data may include instructions for updating a database on the server, where the instructions are derived from the additional results. The data associated with the additional results could also include, for example, an indicator of the relevance of one or more of the documents returned by the initial search. The method may also include updating a search database on the server, such that the results of future searches may be improved.

An embodiment of a system for identifying stored information accessible over a network includes a network client adapted to perform an additional search on initial search results received from a network server, where the network client is further adapted to transfer additional search results to the network server. The network client may include a processor, a storage device, a browser program, and a client-side search program. The client-side search program may be adapted to perform the additional search by comparing the initial search results to user-entered search criteria. Alternatively or in addition, the client-side search program may be adapted to compare user-entered search criteria to downloaded files or documents corresponding to the initial search results. The system may further include the network server, where the server is adapted to transfer the initial search results to the client and receive data associated with additional search results from the client. The network server may include a processor, a storage device and a server-side search program, as well as a search database including data characterizing the stored information (e.g., entries describing web pages available through the network). The server may be further adapted to use the data received from the client to update the database, such that the results of future searches may be improved.

In addition to the method and system described above, a computer-usable carrier medium is contemplated herein. The carrier medium may be a storage medium, such as a magnetic or optical disk, a magnetic tape, or a memory. In addition, the carrier medium may be a transmission medium, such as a wire, cable, or wireless medium along which data or program instructions are transmitted, or a signal carrying the data or program instructions along such a wire, cable or wireless medium. The carrier medium may contain program instructions executable for carrying out embodiments of the methods described herein. For example, a carrier medium may contain program instructions executable for receiving from a network server initial results of an initial search of stored information over a network, performing an additional search of the initial results to produce additional results, and transferring data associated with the additional results to the server. In such an embodiment, the program instructions may form part of a client-side search program. Alternatively, a carrier medium may contain program instructions executable for transferring to a network client initial results of an initial search of stored information available over a network, and for receiving from the network client data associated with additional search results. The carrier medium may further contain program instructions executable for using the data received from the client to update a database used in performing the initial search. Such program instructions may form part of a server-side search program.

BRIEF DESCRIPTION OF THE DRAWINGS

Other objects and advantages of the invention will become apparent upon reading the following detailed description and upon reference to the accompanying drawings in which:

FIG. 4 illustrates exemplary search results obtained at various stages of a method as described herein.

Figure 1:
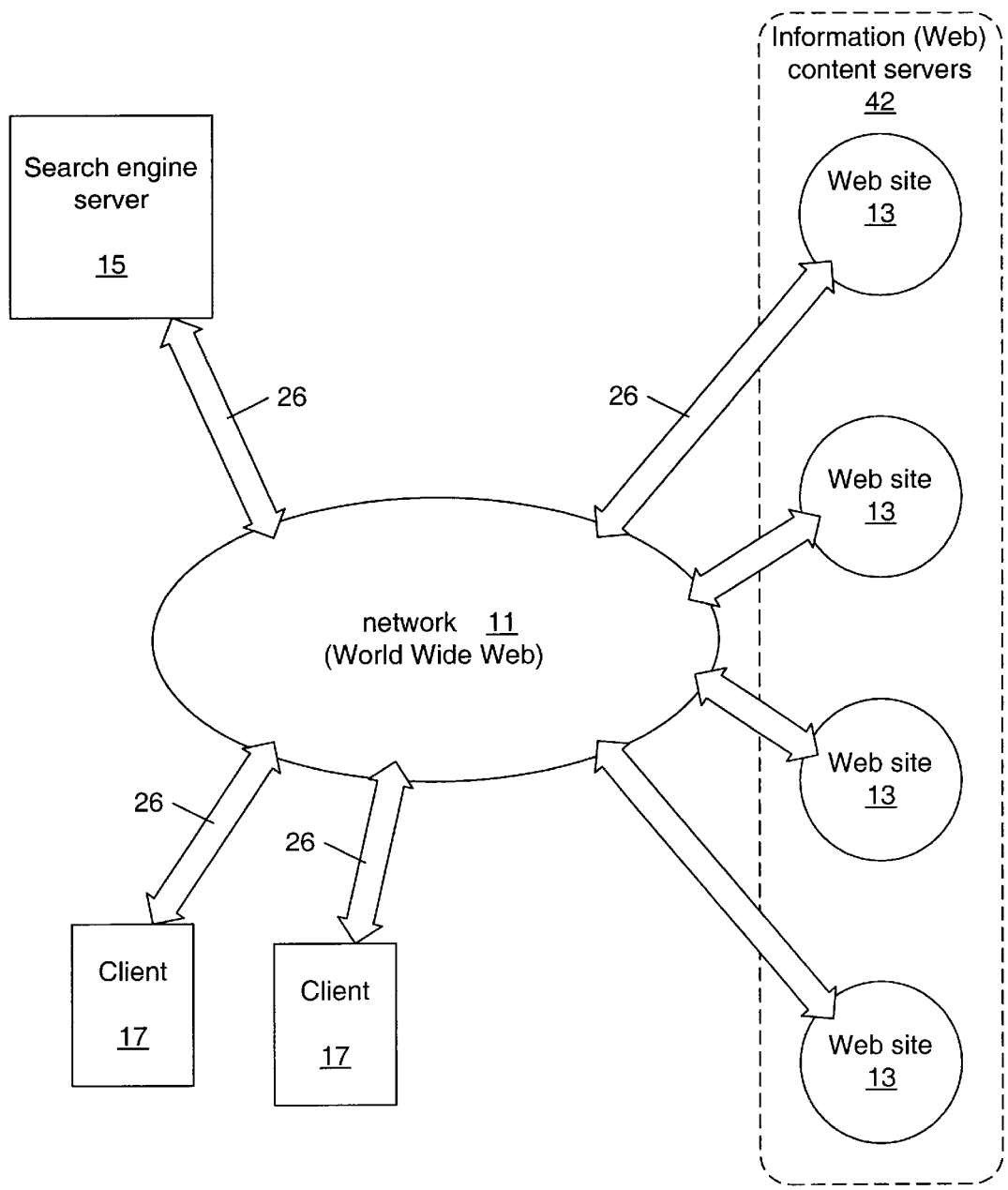
FIG. 1 is a block diagram illustrating a client/server network including a search engine server.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
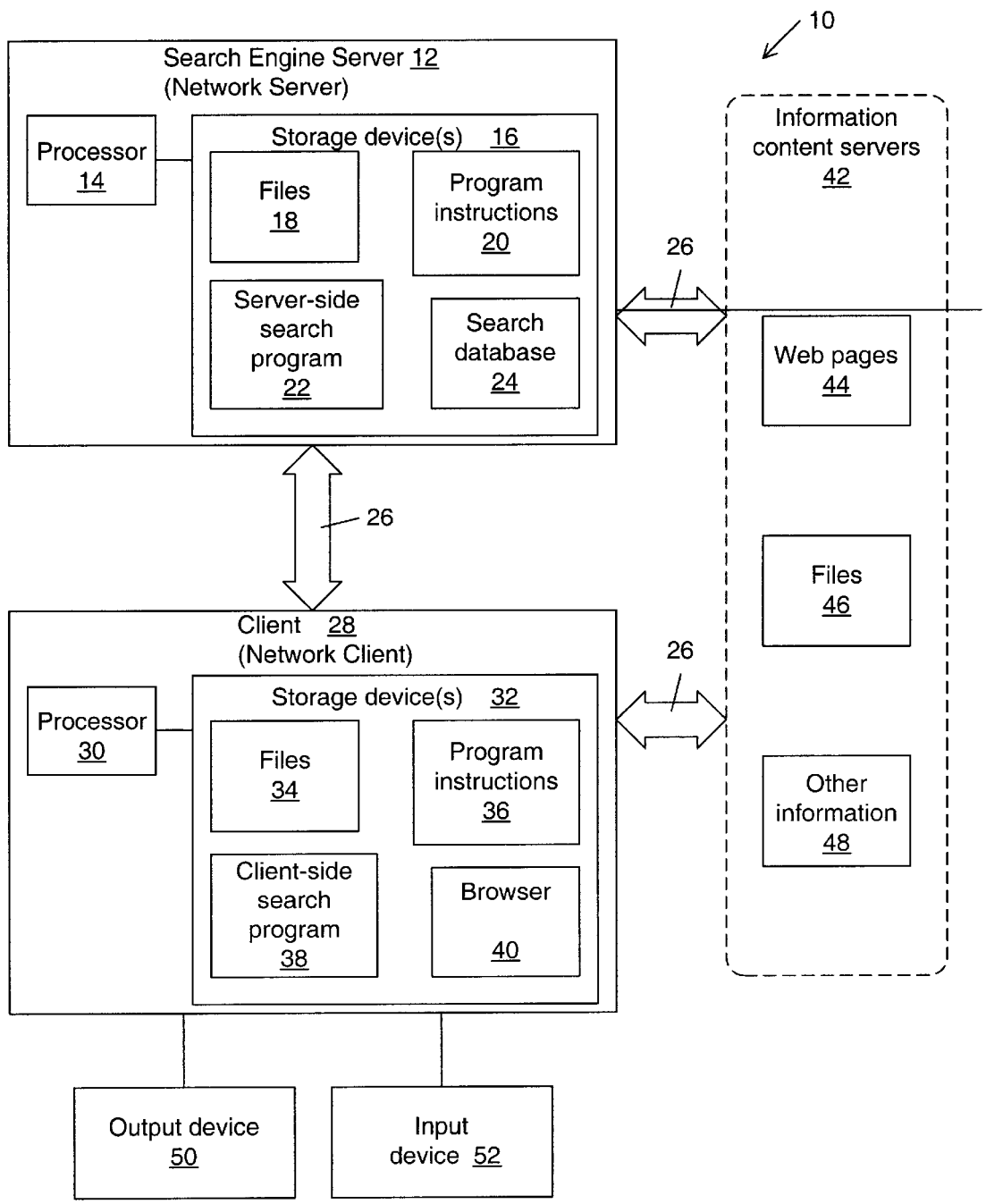
FIG. 2 is a block diagram of an embodiment of a system for identifying stored information accessible over a client/server network using the methods described herein.

An embodiment of a system 10 for identifying stored information accessible using a client/server network is illustrated in FIG. 2. System 10 is a network similar to network 11 of FIG. 1, but with a search engine server 12 and client 28 adapted for performing methods described herein. Search engine server 12 is a computational device which may be, for example, a web server. In the embodiment of FIG. 2, server 12 includes processor 14 and storage device (or devices) 16. Storage device, or storage medium, 16 may take many forms, such as volatile or nonvolatile memory, a magnetic disk such as a hard drive or floppy drive, an optical disk, and/or a magnetic tape. Such a storage device is sometimes referred to as a "direct access storage device" (DASD). Storage device 16 may in some embodiments be a combination of more than one storage device. In the embodiment of FIG. 2, storage device 16 includes files 18 and program instructions 20, also referred to as program executables. The program instructions are typically stored as "executable files" in a storage device and loaded into system memory during execution. Files 18 may include documents such as web pages suitable for viewing by a user of the network, and may contain text, graphics, video and/or audio information. Such document files may be in the HTML language, or in other suitable languages such as Extensible Markup Language (XML) or Wireless Markup Language (WML). Files 18 may also include other files suitable for use in communicating across the network or in identifying stored information accessible using the network. For example, a file including initial search results produced by server-side search program 22 (described further below) may be included in files 18, as may a file containing data associated with additional search results from an additional search performed on a client machine. "Files" as used herein may refer to any collection of data suitable for storing on a computational device or transferring within a network. Program instructions 20 may include various program instructions used to implement functions of network server 12, such as program instructions used to implement the methods described herein.

Storage device 16 may also include server-side search program 22 and search database 24. Although search program 22 is implemented using program instructions (or executables) such as instructions 20, search program 22 is shown separately in FIG. 2 to emphasize this feature of the server. Server-side search program 22 is typically associated with a search engine similar to those currently available for use on the Internet, such as AltaVista or Excite. Search database 24 is accessible by search program 22 for performing searches of network-accessible information. Database 24 is also typically associated with a search engine as described above. The database may contain entries characteristic of files, documents and/or other information stored on information content servers 42 (discussed further below) and accessible over the network. These entries may be established in various ways, such as automatically using a "spider" or "crawler" program associated with the search engine, or through submission by web site developers. Search program 22 may be adapted to receive from a client data associated with an additional search performed by the client, as discussed further below. Alternatively, receiving of such data could be implemented using other program instructions, such as instructions 20. Search database 24 may be modified in response to receipt of such data from a client, so that results of future searches using program 22 and database 24 may be improved. Transmission medium 26 may be used to connect search engine server 12 to other computational devices, such as client 28 and/or information content servers 42. Transmission medium 26 may include, for example, a wire, cable, wireless transmission path, or a combination of these. Protocols used for transmission along transmission medium 26 may include TCP/IP, HTTP, and/or other suitable protocols such as Wireless Applications Protocol (WAP).

System 10 may further include client computational device 28, linked to server 12 using transmission medium 26. In the embodiment of FIG. 2, client 28 includes processor 30 and storage device(s) 32. Storage device 32 is similar to storage device 16 described above, and may include files 34, program instructions 36, a client-side search program 38 and a browser 40. Although programs such as search program 38 and browser 40 are typically implemented using program instructions (or executables) such as instructions 36, search program 38 and browser 40 are each shown separately in FIG. 2 to emphasize these features of the client. Client-side search program 38 may operate in a manner similar to server-side search program 22, except that instead of searching a database such as database 24, which is at least intended to be representative of information stored throughout the network, search program 38 is applied to the set of initial search results sent from server 12 to client 28. In this sense, client-side search program 38 may be considered a "mini" search engine, used to further refine the results sent by the "main" search engine on the server. Such a search program typically operates by comparing user-entered search criteria (such as keywords) to the material being searched. In the case of server-side search program 22, the material being searched is typically the set of entries in search database 24, while in the case of client-side search program 38, the material searched may be the set of initial results. In some embodiments of client-side search program 38, a graphical user interface allowing "manual" categorization and/or ranking of the initial search results may be included. Such an interface could include icons representing the files or documents referenced by the initial search results. These icons could be manipulated by the user with a pointing device. For example, the icons could be arranged in a priority sequence or sorted into categories. Icons corresponding to files determined by the user to be irrelevant to the search criteria could be deleted or discarded. The additional search results arrived at by client-side search program 38 are typically a refined version of the initial results, which may be more appropriately categorized or ranked.

Both search engine server 12 and client 28 are preferably connected (using a transmission medium such as medium 26) to a set of multiple information content servers 42 accessible using the network. Though represented as one block in the diagram of FIG. 2, a network such as the Internet may contain millions of networked servers providing information content (in addition to search engine servers such as server 12 and clients such as client 28). Such information content may include web pages 44, files 46, and/or other information 48. Although web pages such as pages 44 are typically files, other files may be stored on a network, such as files accessible using alternative protocols to HTTP (e.g. File Transfer Protocol, or FTP). Other information 48 may include, for example, dynamically-generated information such as responses to queries. In an embodiment for which network 10 is the Internet, the information content available using content servers 42 may generally be referred to as "resources", or any information identifiable using a Uniform Resource Locator (URL) or substantially equivalent nomenclature.

In some embodiments, the actual documents or files described in the initial results may be retrieved by the client from networked information content servers 42 through transmission medium 26, before an additional search is performed. Search program 38 may in such an embodiment compare the user-entered search criteria to the actual documents or files referenced by the initial search results. Searching of the actual documents in this manner may be most appropriately done in embodiments for which the additional searching performed by the client is done at times of low client machine utilization, or as a background process, rather than being done real-time. To facilitate transfer of initial search results from server 12 to client 28 and transfer of additional search results from client 28 back to server 12, server-side search program 22 and client-side search program 38 are preferably designed to be compatible. As one way of achieving this compatibility, the client-side search program may be installed on the client machine by the server-side search engine when the client first uses the search engine. For example, each time a client (or user) contacts the search engine server, a determination could be made as to whether the user had previously registered with the search engine and received the corresponding client-side search program. This determination could be made by direct query to the user, or in some cases automatically by exchange of information between the client and the search engine server. If the user does not have the client-side program (or, e.g., doesn't have the proper version), the program could be installed by the server onto the client. The client-side search program could also be downloaded from the search engine server by a client in some embodiments, possibly as a Java applet. As another possibility, the client-side search program could be supplied with a computer along with other software. Initial opening of the client-side search program in such an embodiment could establish a connection with the corresponding server-side search program, and allow for any initialization and information transfer needed to allow the programs to work together properly.

Browser program 40 on client 28 may be, for example, a web browser which allows a user to retrieve and view files on the WWW, or a program which performs a similar function on some other network. In some embodiments, client functions involved in implementation of the methods described herein are included in browser 40. For example, browser 40 preferably provides a framework for communication between server-side search program 22 and client-side search program 38, typically by calling an appropriate additional program. Browser 40 (or a program called by the browser) may include user-settable options as to whether additional client-side searching is done real-time or at a later time, or whether it is done at all. Other options could include whether the additional searching is done automatically by the program or (at least in part) manually by the user. Such functions, and/or other functions of the client computing device, may also be implemented in separate program instructions such as program instructions 36 or client-side search program 38. Files 34 may include various files stored on the client computational device, including files downloaded from information content servers 42. Files 34 may also include other files suitable for use in communicating across the network or in identifying stored information accessible using the network. For example, a file including initial search results sent from server 12 may be included in files 34, as may a file containing data associated with additional search results produced using client-side search program 38. Client 28 is typically associated with an output device 50 and input device 52, particularly in embodiments for which the client computational device is operated by a user of system 10. Output device 50 may include, for example, a display screen and/or a printer. Input device 52 may include, for example, a keyboard and/or a pointing device such as a mouse.

In FIG. 2 and any other block diagrams appearing herein, the blocks are intended to represent functionality rather than specific structure. Implementation of the represented system using circuitry and/or software could involve combination of multiple blocks into a single circuit, device, or program, or combination of multiple circuits, devices and/or programs to realize the function of a block. Furthermore, a system such as system 10 may include other elements not explicitly shown. For example, multiple search engine servers and/or clients not shown in FIG. 2 may be included in a system used for implementing the methods described herein. Further, the search engine server, client, and/or information content servers may themselves include additional elements not shown.

Figure 3:
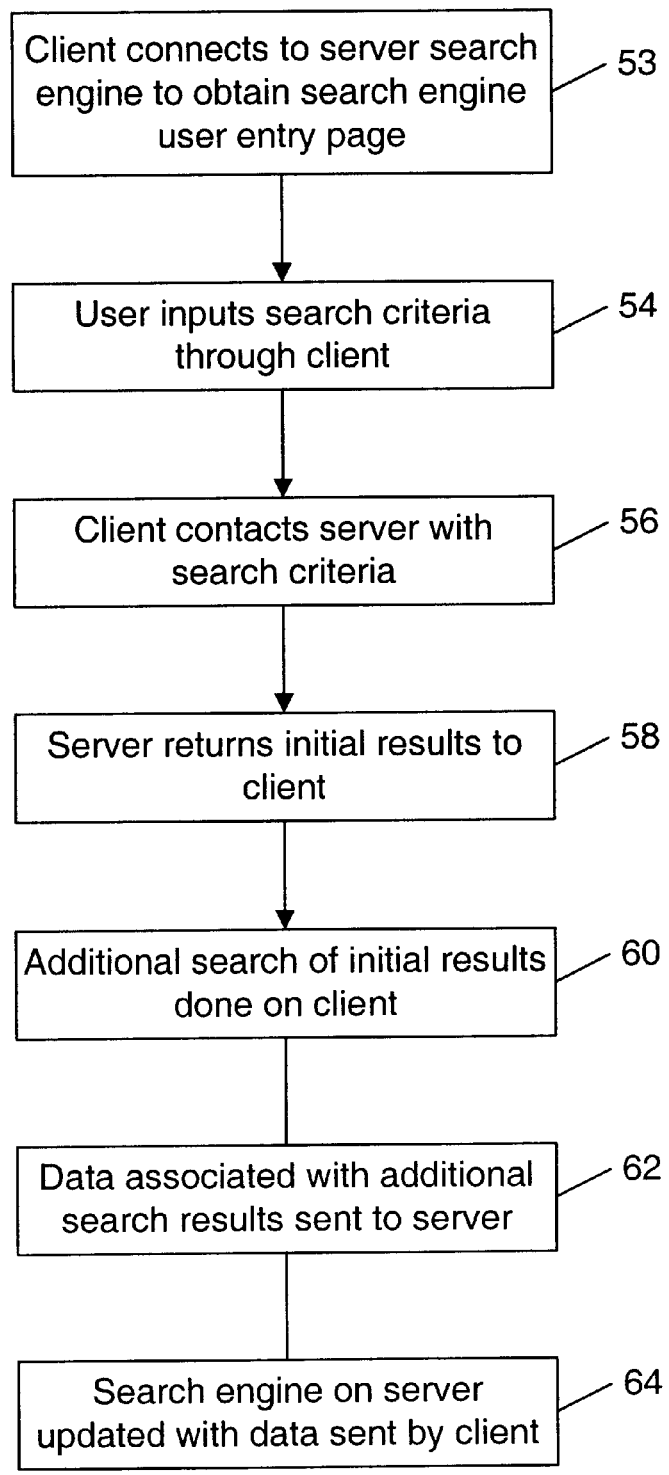
FIG. 3 is a flow diagram illustrating an embodiment of a method for identifying stored information accessible using a client/server network.

Turning now to FIG. 3, a flow diagram illustrating an embodiment of a method for identifying stored information accessible using a client/server network is shown. The method of FIG. 3 may be performed using a system such as system 10 of FIG. 2. In the embodiment of FIG. 3, a client contacts a search engine server (such as server 12 of FIG. 2) and obtains the search engine's page for user entry of search criteria (box 53). The contacting of the search engine is typically done using a browser such as browser 40 of FIG. 2. A user may then enter search criteria through the client (box 54). The search criteria, typically one or more words or phrases associated with a desired topic, are typically entered using a browser, such as browser 40 of FIG. 2, running on a client computer, such as client 28. The client then contacts the server with the search criteria (box 56). The server is typically contacted by a browser such as browser 40, and the search criteria are typically sent to a server-side search program such as program 22. After an initial search is performed on the server (typically by comparing entries in a search database to the search criteria), the server returns initial search results to the client (box 58). The initial results may be returned through instructions in server-side search program 22, or alternatively through separate program instructions such as instructions 20. The initial results may include descriptions of the files, documents or other pieces of network-accessible information found to correspond to the search criteria. Such descriptions may be similar to the corresponding entries in a search database, and each description may include, e.g., a network address, a title and/or a short description of the document. The initial results are typically ranked according to a degree of relevance determined by the server-side search program. The criteria for determining such a ranking may not be clear to the user, however, and in some cases may be affected by factors such as advertising revenue.

As a simple example to help illustrate the concept of the initial results, consider FIG. 4(*a*). Names used in the example of FIG. 4 are fictitious. An exemplary embodiment of a set of initial results returned by a search engine server is shown in FIG. 4(*a*). In this example, a user has entered the search criteria "solar energy". The initial results includes a list of four web pages, including a rank, rating and title for each. The rank is assigned by the search engine such that the pages deemed most relevant are presented first. The rank is in inverse order to the rating, which in this example has a range from 0 to 10. The rating may be determined in various ways. For example, the number of times the search criteria phrase appears in the page may affect the rating, and use of the phrase in the title may weigh more heavily than use of the phrase elsewhere in the page. In some cases, appearance of the search criteria phrase in formatting labels used in creating a web page, such as HTML Meta Keywords Tags, may be weighted more heavily than appearance of the phrase elsewhere. The titles of FIG. 4(*a*) are often in the form of hyperlinks to the corresponding pages, such that a user selection of the hyperlink (or "link") causes the linked page to be transferred to the client computer and displayed. Although not shown in FIG. 4(*a*) for simplicity, a few lines of descriptive information about each page is also typically given.

In the example of FIG. 4, "Solar Energy Unlimited" is a fictitious company selling solar-energy related products and services. The (fictitious) web page for the "Nuclear Energy Promotion Society" contains some discussion asserting the inadequacy of solar energy as compared to nuclear, and has been designed to include keywords and/or HTML meta tags including the phrase "solar energy" as a form of outreach to persons interested in various energy sources. The "Solar Energy Research Institute" web page, though apparently relevant to the "solar energy" query, may be designed in such a way that the algorithms used by the search engine did not assign it as high a rating as some of the other pages. The same may be true for the "International Renewable Energy Society" web page. For example, this page may have information about wind energy and hydroelectric energy presented before the solar energy information, which may have prevented the search engine's spider program from obtaining much solar energy content. Remaining parts of FIG. 4 are discussed below in conjunction with the corresponding portions of the method of FIG. 3.

Returning to the method of FIG. 3, the initial search results are typically received by the client machine using a browser such as browser 40. An additional search of these initial results is subsequently performed using the client (box 60). This additional search is preferably performed using a client-side search program such as program 38 of FIG. 2. As noted above, the additional search may be done in a manner similar to that used in a server-side search engine, except that the additional search is applied to the initial search results sent by the server, rather than to a database representative of all information available on the network. In some embodiments, performing the additional search may include downloading the actual files or documents referenced by the initial results, so that the additional search may be performed on these actual files or documents. Although the additional search would be likely to take longer in such an embodiment, increased accuracy of the search and relevance of the results may be achievable in this way. In some embodiments of performing the additional search, the search may be performed "manually", in that the user evaluates the initial results and/or the corresponding files or documents, and then ranks and/or prioritizes the initial results. Such ranking or prioritizing may in some embodiments be done using a graphical user interface including icons representing the pieces of information referenced by the initial results. Arrangement of the icons, possibly combined with discarding or deleting icons representing information found to be insufficiently relevant to the search, could be used to create the additional results.

Data associated with the additional results may then be sent back to the server (box 62). The data may be sent using a browser such as browser 40 in combination with a client-side search program, but in some embodiments the data may be sent by the client-side search program independent of the browser, or sent using other program instructions such as program instructions 36 of FIG. 2. In some embodiments this data may include the additional results themselves, which may be a refined version of the initial results. For example, if the initial results are in the form of a list of descriptions of files, documents or other information found by a server-side search program to match the search criteria, the additional results may be a shortened, categorized, or re-prioritized version of this list. In some cases, the descriptions in such an embodiment of the additional results may be modified to better reflect the content of the corresponding information, particularly if the information itself is downloaded and searched during the additional search. These additional results may themselves be sent back to the server. In other embodiments, the data sent to the server may include only a subset of the initial results, such as the part of the results found to be most relevant during the additional search, or the part of the initial results which was found during the additional search to be irrelevant to the search criteria. In some embodiments a comparison of the initial results and the additional results could be performed by the client computer, and the data sent to the server could be indicative of the differences between the initial and additional results.

Returning to the "solar energy" example of FIG. 4, an exemplary embodiment of a set of additional search results is shown in FIG. 4(*b*). In this example, the web pages from the initial results have been given new ratings and re-prioritized accordingly. The new ratings may have been arrived at automatically by the client-side search engine. Such an automatic re-prioritization may have been reached, for example, by applying the search criteria to the actual web pages themselves rather than entries in a search engine database. Alternatively or in addition, the client-side search engine may have used refined search criteria provided by the user. The revised rankings could also have been provided manually by the user, possibly through a "drag and drop"-type graphical user interface. In the example of FIG. 4(*b*), the new ranking may reflect, for example, the user's interest in general tutorial information regarding solar energy, rather than products or comparisons with other energy sources. The additional results of FIG. 4(b) may then be communicated back to the server, as discussed above with reference to step 62 of FIG. 3. The results may be sent intact, or some data derived from these results, or from a comparison of the initial and additional results, may be sent.

Returning to the method of FIG. 3, the search engine on the server may be updated upon receipt of the data from the client to account for the additional results (box 64), which may make subsequent searches more accurate and/or relevant. This updating may typically be done by updating a search database, such as database 24, in which entries representing information available on the network are stored. For example, descriptions within some entries may be modified based on the data sent from the client to the server, or keywords associated with some entries may be removed if they are found during the additional search to be insufficiently descriptive of the content of the corresponding stored information. The updating is preferably done by a server-side search program such as program 22 of FIG. 2, but may in some embodiments be done using other program instructions such as program instructions 20. In embodiments for which the entirety of the additional search results obtained by the client are returned to the server, updating the search engine may also include comparing the additional search results to the initial search results to identify differences.

An example of the possible effect of such search engine updating on a subsequent search is illustrated by FIG. 4(c). A subsequent set of initial results, or results of a subsequent search performed by the search engine server, using the "solar energy" criteria is shown in FIG. 4(c). In this example, comparison of FIGS. 4(a) and 4(c) shows that the ratings and ranks of the four web pages returned have changed, in response to the influence of the additional search results of FIG. 4(b). Specifically, the ratings of the Solar Energy Unlimited and Nuclear Energy Promotion Society pages are lowered with respect to those obtained before the receipt of the additional results by the server, while those of the other two pages are increased. Such a changing of the ratings could be arrived at using, for example, a weighted average of the initial result ratings and the additional result ratings. In the case of the ratings of FIG. 4(c), a weight of 1 for the initial result ratings and ½ for the additional result ratings could be used in such a weighted average. Other techniques could also be used to modify subsequent initial results, however. In the example of FIG. 4, the influence of the additional results of FIG. 4(b), returned to the server by one user, is not sufficient to alter subsequent initial results to match these additional results. If many more users returned additional results similar to FIG. 4(b), however, initial results for subsequent searches might be expected to more closely approach the additional results.

Program instructions, such as instructions 20 or 36 of FIG. 2 or instructions within browser 40 and search programs 22 and 38, implementing methods such as that illustrated by FIG. 3 may be transmitted over or stored on a carrier medium. The carrier medium may be a transmission medium such as a wire, cable, or wireless transmission link, or a signal traveling along such a wire, cable or link. The carrier medium may also be a storage medium, such as a volatile or non-volatile memory (e.g., read-only memory or random access memory), a magnetic or optical disk, or a magnetic tape.

It will be appreciated by those skilled in the art having the benefit of this disclosure that this invention is believed to provide a system and method for identifying stored information accessible over a network. Furthermore, it is also to be understood that the form of the invention shown and described is to be taken as exemplary, presently preferred embodiments. Various modifications and changes may be made without departing from the spirit and scope of the invention as set forth in the claims. For example, the system and methods described herein may be implemented using many combinations of hardware and/or software, and at one or more of many different levels of hardware and/or software, as is the case with many computer-related applications. It is intended that the following claims be interpreted to embrace all such modifications and changes.

What is claimed is:

1. A method of using a network client in identifying stored information accessible over a network, said method comprising:

receiving initial results of an initial search by the network client of the stored information from a network server;

performing an additional search of the initial results by the network client on the initial results received from the network server and stored in the network client, wherein the additional search provides additional results; and transferring data associated with the additional results from the network client back to the network server.

2. The method as recited in claim 1, wherein said identifying stored information comprises identifying information accessible using the Internet.

3. The method as recited in claim 1, wherein said receiving initial results comprises receiving descriptions of files accessible over the network.

4. The method as recited in claim 3, wherein said receiving descriptions comprises receiving network addresses associated with the files.

5. The method as recited in claim 1, wherein said performing an additional search comprises comparing the initial results to user-entered criteria.

6. The method as recited in claim 3, wherein said performing an additional search comprises downloading the files corresponding to the initial results, and comparing the downloaded files to user-entered criteria.

7. The method as recited in claim 1, wherein said performing an additional search comprises categorizing files referenced by the initial results.

8. The method as recited in claim 7, wherein said categorizing comprises manipulating icons within a graphical user interface executable on the network client.

9. The method as recited in claim 1, wherein said transferring data associated with the additional results comprises transferring a categorization of the initial results.

10. The method as recited in claim 3, wherein said transferring data associated with the additional results comprises transferring an indicator of the relevance of one or more of the files.

11. The method as recited in claim 1, wherein said transferring data comprises transferring the additional results.

12. The method as recited in claim 1, wherein said transferring data comprises transferring instructions for updating a database, and wherein said instructions are derived from said additional results.

13. The method as recited in claim 1, wherein said performing an additional search and said transferring data are done during times of reduced system utilization of the network client.

14. The method as recited in claim 1, wherein said performing an additional search and said transferring data comprise background processes of the network client.

15. A method of using a network server in identifying stored information accessible over a network, said method comprising:

transferring to a network client initial results of an initial search of the stored information;

receiving from the network client data associated with additional results from an additional search of the initial results transferred to and located on the network client; and using the received data to update a database on the network server containing information characterizing the stored information, such that results of future searches may be improved.

16. A system for identifying stored information accessible over a network, said system comprising a network client adapted to perform an additional search on initial search results received from a network server, wherein the network client is further adapted to transfer data associated with additional search results to the network server.

17. The system as recited in claim 16, wherein the network client comprises a computational device.

18. The system as recited in claim 17, wherein the computational device comprises a computer, telephone or personal digital assistant.

19. The system as recited in claim 16, wherein the network client comprises a processor, a storage device, a browser program, and a client-side search program.

20. The system as recited in claim 19, wherein the client-side search program is adapted to compare the initial search results to user-entered criteria.

21. The system as recited in claim 19, wherein the client-side search program is adapted to compare network-accessible files referenced within the initial search results to user-entered criteria.

22. The system as recited in claim 19, wherein the client-side search program is adapted to categorize network-accessible files referenced within the initial search results.

23. A system for identifying stored information accessible over a network, said system comprising a network server adapted to transfer initial search results to a network client and receive from the network client data associated with additional search results from an additional search of the initial search results.

24. The system as recited in claim 23, wherein said network server further comprises a database including information characterizing network-accessible files, and wherein said network server is further adapted to use the data received from the network client to update the database, such that the results of future searches may be improved.

25. A computer-usable carrier medium, comprising:

first program instructions executable on a computational device of a network client for receiving from a network server initial results of an initial search of stored information available over a network linking the computational device and the network server;

second program instructions executable on the computational device of the network client for performing an additional search of the initial results, wherein the additional search provides additional results; and third program instructions executable on the computational device of the network client for transferring data associated with the additional results to the network server.

26. The carrier medium as recited in claim 25, wherein said first program instructions are further adapted to receive said initial results from a server-side search program executable on said network server.

27. A computer-usable carrier medium, comprising:

first program instructions executable on a computational device of a network server for transferring to a network client initial results of an initial search of stored information available over a network linking the computational device and the network client; and second program instructions executable on the computational device of the network server for receiving data associated with additional search results from the network client.

28. The carrier medium as recited in claim 27, further comprising third program instructions executable on the computational device for using the data received from the network client to update a database used in performing the initial search.

\* \* \* \* \*